(No Model.)

A. W. NEWELL.
OIL OR GAS WELL PACKER.

No. 423,338. Patented Mar. 11, 1890.

Witnesses:
E. P. Ellis
J. M. Nesbit

Inventor:
A. W. Newell,
per North & Lehmann,
atty

UNITED STATES PATENT OFFICE.

AUGUSTUS W. NEWELL, OF BRADFORD, PENNSYLVANIA.

OIL OR GAS WELL PACKER.

SPECIFICATION forming part of Letters Patent No. 423,338, dated March 11, 1890.

Application filed January 2, 1890. Serial No. 335,638. (No model.)

*To all whom it may concern:*

Be it known that I, AUGUSTUS W. NEWELL, of Bradford, in the county of McKean and State of Pennsylvania, have invented certain new and useful Improvements in Oil or Gas Well Packers; and I do hereby declare the following to be a full, clear, and exact description of the invention, such as will enable others skilled in the art to which it pertains to make and use it, reference being had to the accompanying drawings, which form part of this specification.

My invention relates to an improvement in oil or gas well packing; and it consists in the construction and arrangement hereinafter described, and pointed out in the claims.

The object of my invention is to provide a rubber oil-well packing, which is braced externally by means of metallic rings and internally by short tubes or sleeves, so as to adapt the packing to be used again and again, which cannot be done where the packing is made of rubber alone.

Figure 1:
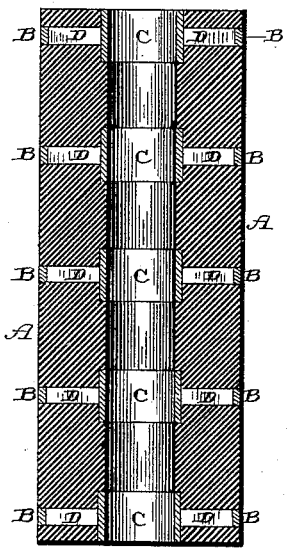
Figure 2:
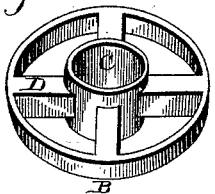

In the accompanying drawings, Figure 1 represents a vertical section of a packer which embodies my invention. Fig. 2 is a perspective of my protector for oil or gas well rubber packings.

A represents the packing, which is made of rubber, and which is cast in a suitable mold after the strengthening-rings B and the central tubes or sleeves C have been placed in position. There are any desired number of the rings B, which may be provided with points or projections D, which extend to the central opening through the packing, or made plain, just as may be preferred. The rings will be given any desired width and thickness, and being just flush with the outer surface of the packing they serve to brace and strengthen the rubber and prevent it from being crowded in the crevices, which render it very difficult to pack or withdraw. The tube or sleeve C extends only under each ring. There being a number of rings applied to the outer side of the packing, they serve the purpose of two or more packings by causing a spreading or bulging of the rubber between the bands. Owing to the protection of the rings and the internal tube or sleeve the packing is not disfigured, broken, or injured to any material extent by being used first in a well, and hence they are adapted to be used over and over again, which is not possible where a rubber packing alone is used. These bands and central tubes or sleeves also serve to strengthen the packing, so as to enable it to withstand a greater amount of pressure at the same time that the action of the packing is made more perfect by causing the rubber to bulge or extend at different points between the rings or bands. It will be noticed that these rings or bands B do not extend to the end of the rubber, but are inserted in the sides of the rubber at a suitable distance therefrom, and no claim is made in this application, broadly, to applying a metallic ring or band to the ends of the packing.

It will be readily understood that the inner ends of the projections D and the internal rings C can be rigidly secured together or formed integral without departing from the spirit of my invention.

Having thus described my invention, I claim—

1. The combination of a rubber packing provided with metallic bands which are applied to its sides in between its ends, and provided with spurs or projections which extend entirely through the packing, substantially as described.

2. The combination of a rubber packing with a series of rings applied to its outer surface, and internal tubes or sleeves, substantially as shown and described.

3. A protector for oil or gas well rubber packing, consisting of external and internal rings or tubes, and arms or projections which pass through the packing and connect the two, substantially as shown and described.

In testimony whereof I affix my signature in presence of two witnesses.

AUGUSTUS W. NEWELL.

Witnesses:
H. S. SOUTHALL,
C. C. NORTH.